US008437010B2

(12) United States Patent
Bostanjoglo et al.

(10) Patent No.: US 8,437,010 B2
(45) Date of Patent: May 7, 2013

(54) SURFACE ANALYSIS FOR DETECTING CLOSED HOLES, AND DEVICE

(75) Inventors: Georg Bostanjoglo, Berlin (DE); Torsten Melzer-Jokisch, Neuenhagen bei Berlin (DE); Andreas Oppert, Falkensee (DE); Dimitrios Thomaidis, Berlin (DE)

(73) Assignees: Siemens Aktiengesellschaft, München (DE); Chromalloy Gas Turbine LLC, Orangeburg, NY (US)

( * ) Notice: Subject to any disclaimer, the term of this patent is extended or adjusted under 35 U.S.C. 154(b) by 0 days.

(21) Appl. No.: 13/502,787

(22) PCT Filed: Oct. 13, 2010

(86) PCT No.: PCT/EP2010/065347
§ 371 (c)(1),
(2), (4) Date: Jul. 10, 2012

(87) PCT Pub. No.: WO2011/047995
PCT Pub. Date: Apr. 28, 2011

(65) Prior Publication Data
US 2012/0268747 A1     Oct. 25, 2012

(30) Foreign Application Priority Data
Oct. 20, 2009   (EP) .................................... 09013245

(51) Int. Cl.
*G01B 11/24* (2006.01)
(52) U.S. Cl.
USPC ............... 356/602; 348/92; 348/93; 348/370; 356/241.1; 356/604

(58) Field of Classification Search ............. 348/92–93, 348/370; 356/241.1, 604, 602
See application file for complete search history.

(56) References Cited

U.S. PATENT DOCUMENTS

| | | | |
|---|---|---|---|
| 5,216,808 A | 6/1993 | Mannava | |
| 6,024,792 A | 2/2000 | Bieler | |
| 6,524,395 B1 * | 2/2003 | Devine, II | 29/889.1 |
| 8,274,662 B2 * | 9/2012 | Monks et al. | 356/604 |
| 2002/0076097 A1 | 6/2002 | Vaidyanathan | |

FOREIGN PATENT DOCUMENTS

| | | |
|---|---|---|
| EP | 0486489 B1 | 11/1994 |
| EP | 0412397 B1 | 3/1998 |
| EP | 0892090 A1 | 1/1999 |
| EP | 0786017 B1 | 3/1999 |
| EP | 1319729 A1 | 6/2003 |
| EP | 1204776 B1 | 6/2004 |
| EP | 1306454 B1 | 10/2004 |
| EP | 151 0283 A1 | 3/2005 |
| EP | 1941965 A1 | 7/2008 |
| EP | 2093641 A1 | 8/2009 |
| WO | WO 9967435 A1 | 12/1999 |
| WO | WO 0044949 A1 | 8/2000 |

* cited by examiner

Primary Examiner — Layla Lauchman
Assistant Examiner — Iyabo S Alli

(57) ABSTRACT

A process for determining the position of closed holes in a component is provided. By carrying out laser triangulation measurements on an uncoated component and a coated component with holes, the exact position of the holes to be reopened may be detected following the coating. A device used to carry out this process is also provided.

11 Claims, 4 Drawing Sheets

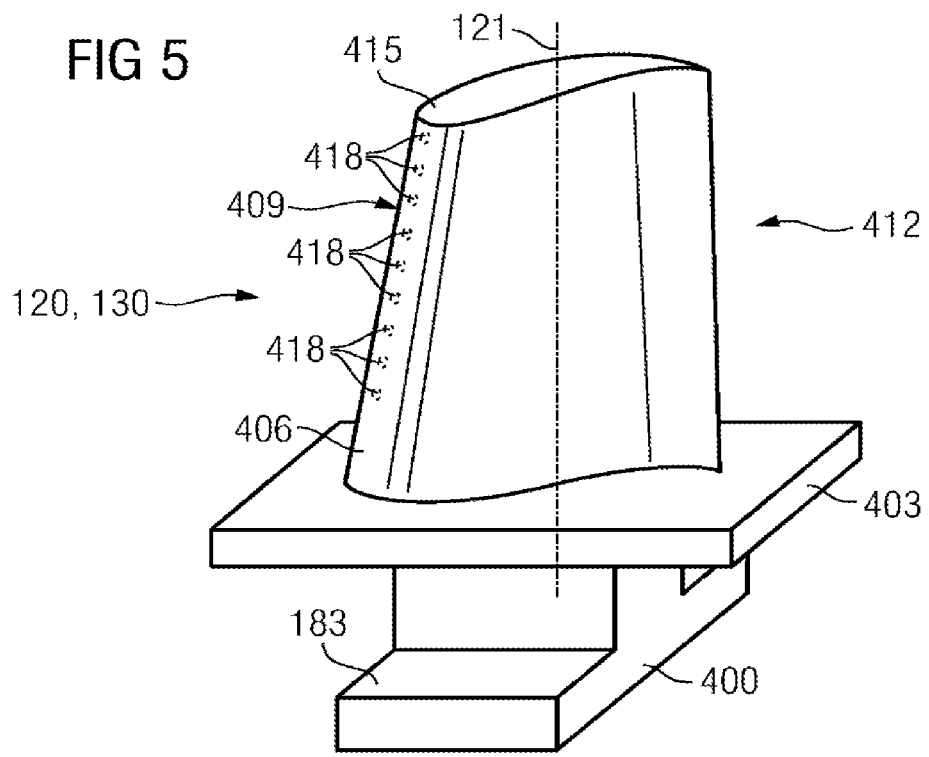
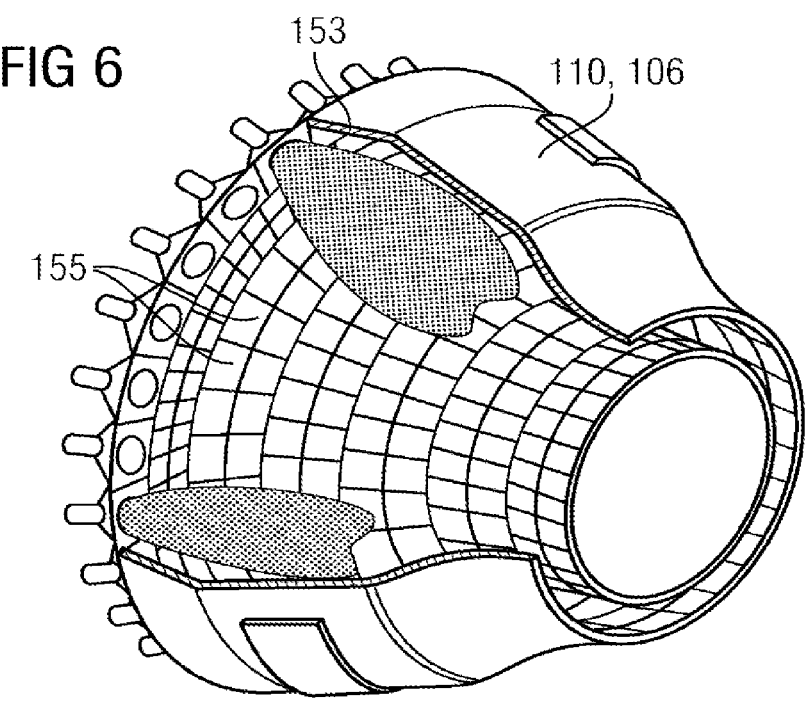

FIG 7

| Material | Chemical composition in % | | | | | | | | | | | | |
|---|---|---|---|---|---|---|---|---|---|---|---|---|---|
| | C | Cr | Rest | Rem | Mo | W | Ta | Nb | Al | Ti | B | Zr | Hf |
| Ni-based investment casting alloys | | | | | | | | | | | | | |
| GTD 222 | 0.10 | 22.5 | Rest | 19.0 | | 2.0 | 1.0 | | 1.2 | 2.3 | 0.008 | | |
| IN 939 | 0.15 | 22.4 | Rest | 19.0 | | 2.0 | 1.4 | 1.0 | 1.9 | 3.7 | 0.009 | 0.10 | |
| IN 6203 DS | 0.15 | 22.0 | Rest | 19.0 | | 2.0 | 1.1 | 0.8 | 2.3 | 3.5 | 0.010 | 0.10 | 0.75 |
| Udimet 500 | 0.10 | 18.0 | Rest | 18.5 | 4.0 | | | | 2.9 | 2.9 | 0.006 | 0.05 | |
| IN 738 LC | 0.10 | 16.0 | Rest | 8.5 | 1.7 | 2.6 | 1.7 | 0.9 | 3.4 | 3.4 | 0.010 | 0.10 | |
| SC 16 | <0.01 | 16.0 | Rest | | 3.0 | | 3.5 | | 3.5 | 3.5 | <0.005 | <0.008 | |
| Rene 80 | 0.17 | 14.0 | Rest | 9.5 | 4.0 | 4.0 | | | 3.0 | 5.0 | 0.015 | 0.03 | |
| GTD 111 | 0.10 | 14.0 | Rest | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rest | 9.0 | 1.9 | 4.1 | 4.1 | | 3.4 | 3.8 | 0.015 | 0.02 | 1.00 |
| IN 792 DS | 0.08 | 12.5 | Rest | 9.0 | 1.9 | 4.1 | 4.1 | | 3.4 | 3.8 | 0.015 | 0.02 | |
| MAR M 002 | 0.15 | 9.0 | Rest | 10.0 | | 10.0 | 2.5 | | 5.5 | 1.5 | 0.015 | 0.05 | 1.50 |
| MAR M 247 LC DS | 0.07 | 8.1 | Rest | 9.2 | 0.5 | 9.5 | 3.2 | | 5.6 | 0.7 | 0.015 | 0.02 | 1.40 |
| CMSX-2 | <.006 | 8.0 | Rest | 4.6 | 0.6 | 8.0 | 6.0 | | 5.6 | 1.0 | <.003 | <.0075 | 0.10 |
| CMSX-3 | <.006 | 8.0 | Rest | 4.6 | 0.6 | 8.0 | 6.0 | | 5.6 | 1.0 | <.003 | <.0075 | 0.10 |
| CMSX-4 | | 6.0 | Rest | 10.0 | 0.6 | 6.0 | 6.0 | | 5.6 | 1.0 | | Re=3.0 | |
| CMSX-6 | <.015 | 10.0 | Rest | 5.0 | 3.0 | <.10 | 2.0 | <.10 | 4.9 | 4.8 | <.003 | <.0075 | 0.10 |
| PWA 1480 SX | <.006 | 10.0 | Rest | 5.0 | | 4.0 | 12.0 | | 5.0 | 1.5 | <.0075 | <.0075 | |
| PWA 1483 SX | 0.07 | 12.2 | Rest | 9.0 | 1.9 | 3.8 | 5.0 | | 3.6 | 4.2 | 0.0001 | 0.002 | |
| Co-based investment casting alloys | | | | | | | | | | | | | |
| FSX 414 | 0.25 | 29.0 | 10 | Rest | | 7.5 | | | | | 0.010 | | |
| X 45 | 0.25 | 25.0 | 10 | Rest | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rest | | 7.5 | 4 | | | 0.3 | 0.010 | 0.60 | |
| CM 247 | 0.07 | 8.3 | Rest | 10.0 | 0.5 | 9.5 | 3.2 | | 5.5 | 0.7 | | | 1.5 |

SURFACE ANALYSIS FOR DETECTING CLOSED HOLES, AND DEVICE

CROSS REFERENCE TO RELATED APPLICATIONS

This application is the U.S. National Stage of International Application No. PCT/EP2010/065347, filed Oct. 13, 2010 and claims the benefit thereof. The International Application claims the benefits of German application No. 09013245.7 EP filed Oct. 20, 2009. All of the applications are incorporated by reference herein in their entirety.

FIELD OF INVENTION

The invention relates to a process for surface analysis for detecting closed holes.

BACKGROUND OF INVENTION

During the repair of turbine blades or vanes, the worn ceramic protective layer has to be removed and, after restoration, reapplied. In this case, the cooling-air holes which are present are partially or completely closed during the coating process. The position and orientation of the borehole axes of the cooling-air holes cannot be determined or can only be partially determined. To date, the holes have been identified in part by finding slight depressions in the ceramic layer and/or relatively small openings, and opened with the aid of a manual process. A reliable, controllable system is not available.

SUMMARY OF INVENTION

Therefore, it is an object of the invention to solve the problem mentioned above.

The object is achieved by a process as claimed in the claims and by a device as claimed in the claims.

The dependent claims list further advantageous measures which can be combined with one another, as desired, in order to obtain further advantages.

BRIEF DESCRIPTION OF THE DRAWINGS

FIG. 5 shows a turbine blade or vane,
FIG. 6 shows a combustion chamber,
and
FIG. 7 shows a list of superalloys.

The description and the figures represent merely exemplary embodiments of the invention.

DETAILED DESCRIPTION OF INVENTION

Figure 1:
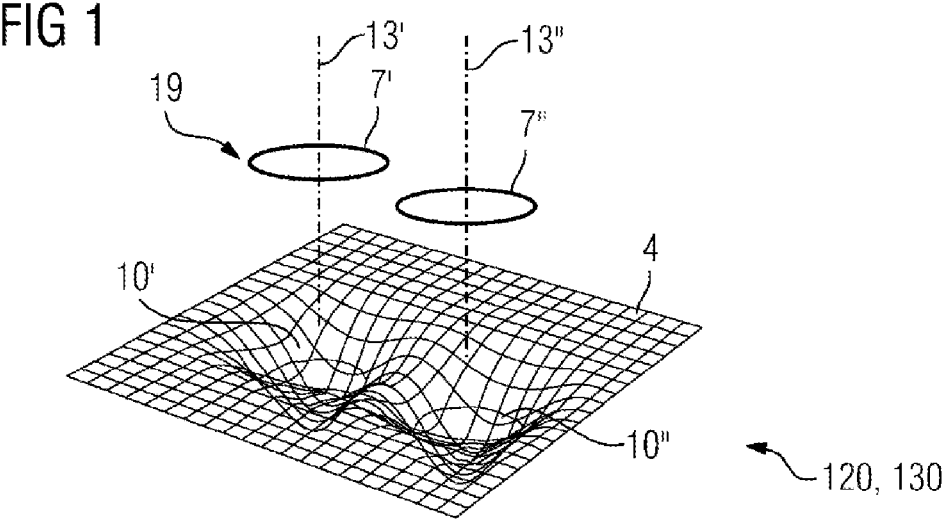
FIGS. 1, 2, 3 schematically show the course of the process.

FIG. 1 shows a coating model 4 of determined geometrical data of two holes with a coating (not shown).

FIG. 1 also shows a mask model 19 with theoretical assumptions in relation to the position 7', 7" of at least one hole and to the orientation 13', 13" of the hole.

The mask model 19 can also be determined by measuring the uncoated component 120, 130.

The surface of curved areas can be determined, preferably by means of triangulation measurement processes, in an acceptable resolution and in a very short time in a plurality of dimensions.

The blade or vane 120, 130, here as an exemplary component, is scanned in the uncoated state at the relevant locations in order to define the position of the holes and/or in order to define the location of the axes of the holes. These data are later used in the computation unit 16 as a mask model 19 (FIGS. 1, 2).

Similarly, known geometrical data of the component 120, 130 can be used as the mask model 19, these being known in advance for example from the manufacturing stage.

Figure 2:
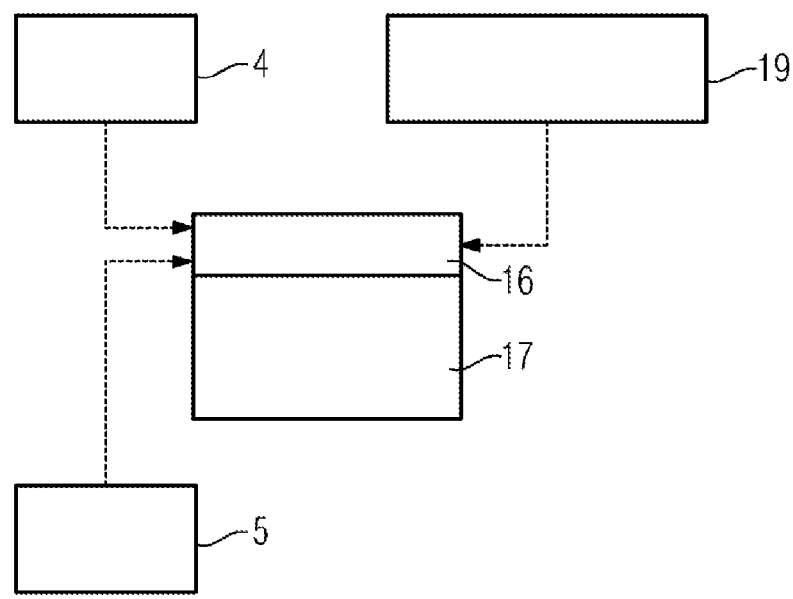

In any event, the hole axis and the hole angle (position of the hole) must be present in a data record (19 in FIG. 2).

FIG. 2 shows that the computation unit 16 receives data of a mask model 19 or known geometrical data 5, which are measured.

This is followed by coating of the component 120, 130. Then, the coated component 120, 130 is measured again, in particular by means of laser triangulation, as a result of which a coating model 4 is formed.

In combination with a previously determined orientation 7', 7" of the hole or the holes, it is possible to exactly indicate the position and direction of cooling-air holes in the coated/closed state.

Here, an iterative comparison 17 of the two models 4, 19 is carried out until the position or center of the hole and bore axis are determined.

In this case, the position of the depression in a trough 10', 10" of a completely closed hole or the position 10', 10" of the opening of a partially closed hole is used to determine the center of the hole and the location of the axis of the unclosed hole.

Figure 3:

Similarly, the border of the trough 10', 10" can be compared with the border of the hole (FIG. 3) in order to determine the position of the hole. In this case, depending on the coating, the border of the trough 10', whether it is small or large, has to have a certain orientation in the border 7', here for example concentric (FIG. 3). If there are a plurality of holes, the best fit is determined iteratively over all the holes. Only in this way is it possible for the holes to be reopened.

With the aid of a computer, the midpoint of a hole can then be calculated (17 in FIG. 2) and a machining program for reopening can be generated, which makes it possible to remove the "coat down" from the hole.

In addition to the computer-aided determination of positional and angular data for cooling-air holes underneath a coating, the essential advantage here is primarily the exact position of the cooling-air bore for each individual blade or vane and in each state of production. At present, it is only possible to predict the warpage of a blade or vane 120, 130 during the coating using empirically determined approaches. The methodology used here can check this prediction and determine an exact position (step 17 in FIG. 2).

Figure 4:
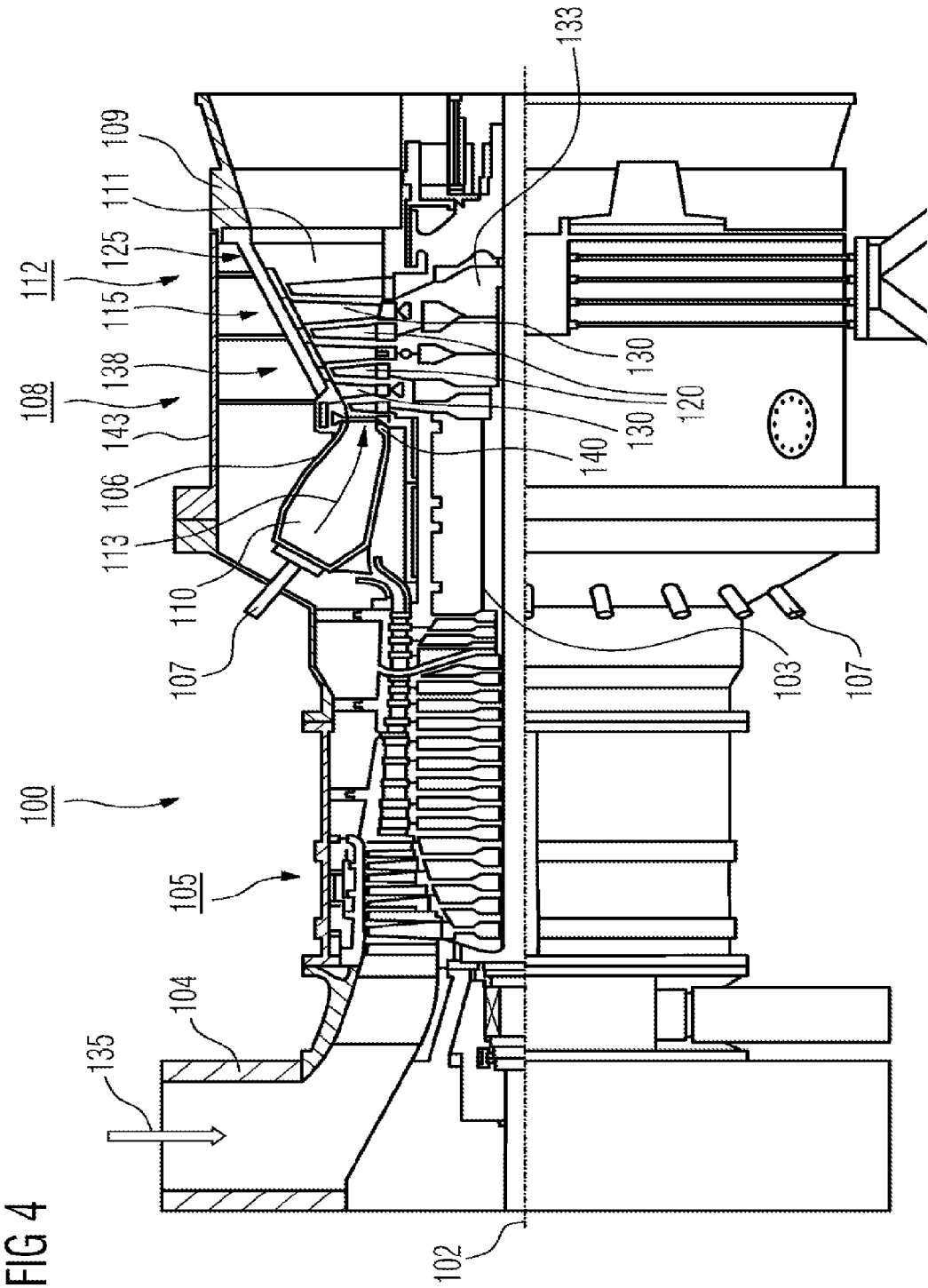
FIG. 4 shows a gas turbine.

FIG. 4 shows, by way of example, a partial longitudinal section through a gas turbine 100.

In the interior, the gas turbine 100 has a rotor 103 with a shaft which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949.

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

FIG. 5 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf). Alloys of this type are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer, to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

The thermal barrier coating covers the entire MCrAlX layer. Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

The blade or vane 120, 130 may be hollow or solid in form. If the blade or vane 120, 130 is to be cooled, it is hollow and may also have film-cooling holes 418 (indicated by dashed lines).

FIG. 6 shows a combustion chamber 110 of the gas turbine 100.

The combustion chamber 110 is configured, for example, as what is known as an annular combustion chamber, in which a multiplicity of burners 107, which generate flames 156, arranged circumferentially around an axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1.

It is also possible for a, for example ceramic, thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks.

Refurbishment means that after they have been used, protective layers may have to be removed from turbine blades or vanes 120, 130 or heat shield elements 155 (e.g. by sandblasting). Then, the corrosion and/or oxidation layers and products are removed. If appropriate, cracks in the turbine blade or vane 120, 130 or in the heat shield element 155 are also repaired. This is followed by recoating of the turbine blades or vanes 120, 130 or heat shield elements 155, after which the turbine blades or vanes 120, 130 or the heat shield elements 155 can be reused.

The invention claimed is:

1. A process for the surface analysis of at least partially closed holes in a component which are to be opened following coating, the process comprising:
   measuring the component comprising unclosed holes in the uncoated state and a mask model is generated which contains the position of the holes and also the orientation of the longitudinal axes thereof;
   coating the component;
   carrying out a measurement by means of laser triangulation with the coated component and the at least partially closed holes wherein the data record thus generated represents the coating model; and
   comparing the mask model with the coating model in order to make it possible to detect the closed holes wherein the best possible concurrence of the mask model and the coating model is determined by iteration in order to ascertain the exact position of the at least partially closed holes.

2. The process as claimed in claim 1, wherein the measuring is done by means of laser triangulation measurement.

3. The process as claimed in claim 1, wherein completely closed holes are detected.

4. The process as claimed in claim 3, wherein only closed holes are detected.

5. The process as claimed in claim 1, wherein only partially closed holes are detected.

6. The process as claimed in claim 5, wherein only partially closed holes are detected.

7. A process for reopening coated holes in a component, comprising:
   detecting the position and orientation of the holes by the process as claimed in claim 1; and
   reopening the holes with a machining program, which has been generated by the comparison between the mask model and the coating model.

8. The process as claimed in claim 7, wherein the measuring is done by means of laser triangulation measurement.

9. A device, comprising:
   a component
   a mount for the component;
   a measuring sensor; and
   a computation unit with a storage unit for mask models and coating models which iteratively determines the position and orientation of holes in the component,
   wherein the device carries out the process as claimed in claim 1.

10. The device as claimed in claim 9, wherein the measuring sensor is a sensor for laser triangulation.

11. The device as claimed in claim 9, wherein the computation unit generates a machining program.

* * * * *